United States Patent [19]

Roberts

[11] Patent Number: 4,655,005

[45] Date of Patent: Apr. 7, 1987

[54] APPARATUS AND PROCESS FOR DRY CUTTING OF PLASTIC OPTICAL LENSES

[75] Inventor: Tiner E. Roberts, St. Stephen, Minn.

[73] Assignee: Flo-Bob Industries Inc., St. Cloud, Minn.

[21] Appl. No.: 864,267

[22] Filed: May 19, 1986

Related U.S. Application Data

[63] Continuation of Ser. No. 694,445, Jan. 24, 1985, Pat. No. 4,589,231.

[51] Int. Cl.⁴ .............................................. B24B 7/00
[52] U.S. Cl. .............................. 51/124 L; 51/94 R; 51/96; 51/273
[58] Field of Search ............... 51/124 L, 94 R, 96, 51/273

[56] References Cited

U.S. PATENT DOCUMENTS

| | | | |
|---|---|---|---|
| 1,188,328 | 6/1916 | Scarpitto | 51/273 |
| 2,589,488 | 3/1952 | Fowler | 51/124 |
| 2,747,339 | 5/1956 | Schelling | 51/124 L |
| 3,106,133 | 10/1963 | Arpaio, Jr. et al. | 90/12 |
| 3,394,500 | 7/1968 | Lill et al. | 51/273 |
| 3,685,210 | 8/1972 | Bowen | 51/33 |
| 3,971,164 | 7/1976 | Albin et al. | 51/129 |
| 4,493,168 | 1/1985 | Field, Jr. | 51/165.87 |
| 4,541,760 | 9/1985 | Zoucki | 409/137 |
| 4,589,231 | 5/1986 | Roberts | 51/124 L |

Primary Examiner—Frederick R. Schmidt
Assistant Examiner—Robert A. Rose
Attorney, Agent, or Firm—Herman H. Bains

[57] ABSTRACT

A process and apparatus for dry lens generation of a plastic optical lens includes a chamber structure in which the lens grinding tool and the lens blank holder are positioned. The chamber is provided with a large unobstructed inlet and an outlet connected in communicating relation to a vacuum system so that the high volume, high velocity stream of ambient air is directed across the interface between the grinding tool and the lens blank to thereby entrain the cut plastic material in the stream for evacuation through the outlet. The grinding tool is diamond plated and the spacing between the diamond elements is of a sufficient magnitude to permit single point cutting of the material to thereby eliminate any tendency of the material to adhere to the grinding tool. A misting nozzle discharges a fine lubricating mist across the lens blank grinding tool interface when a lens is being formed from polycarbonate.

1 Claim, 5 Drawing Figures

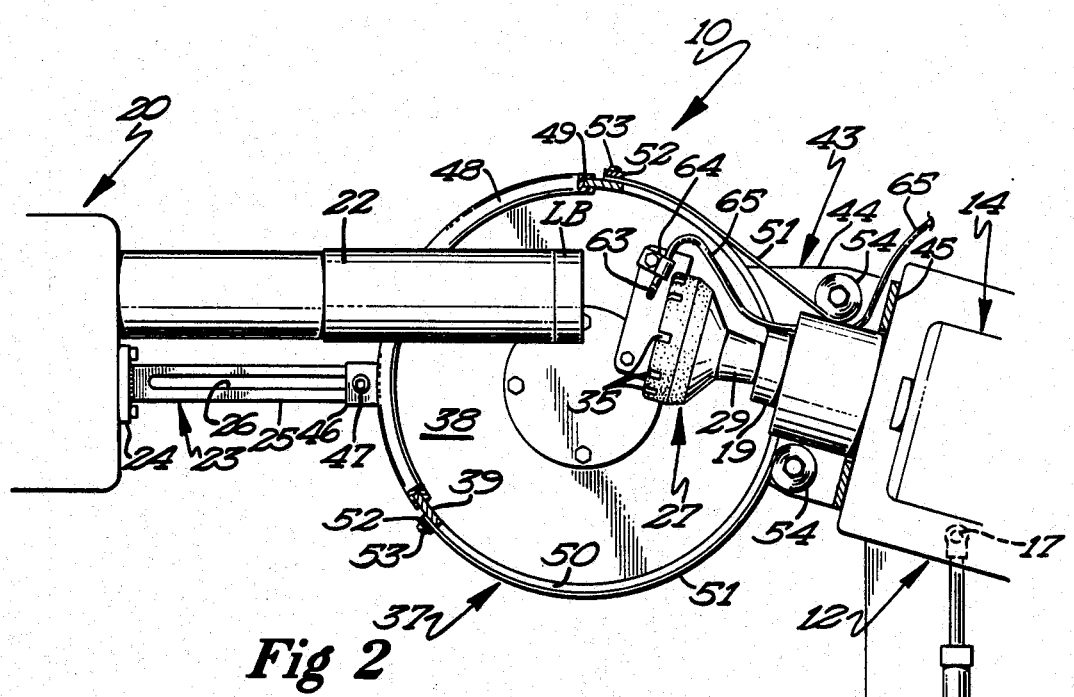
Fig 2
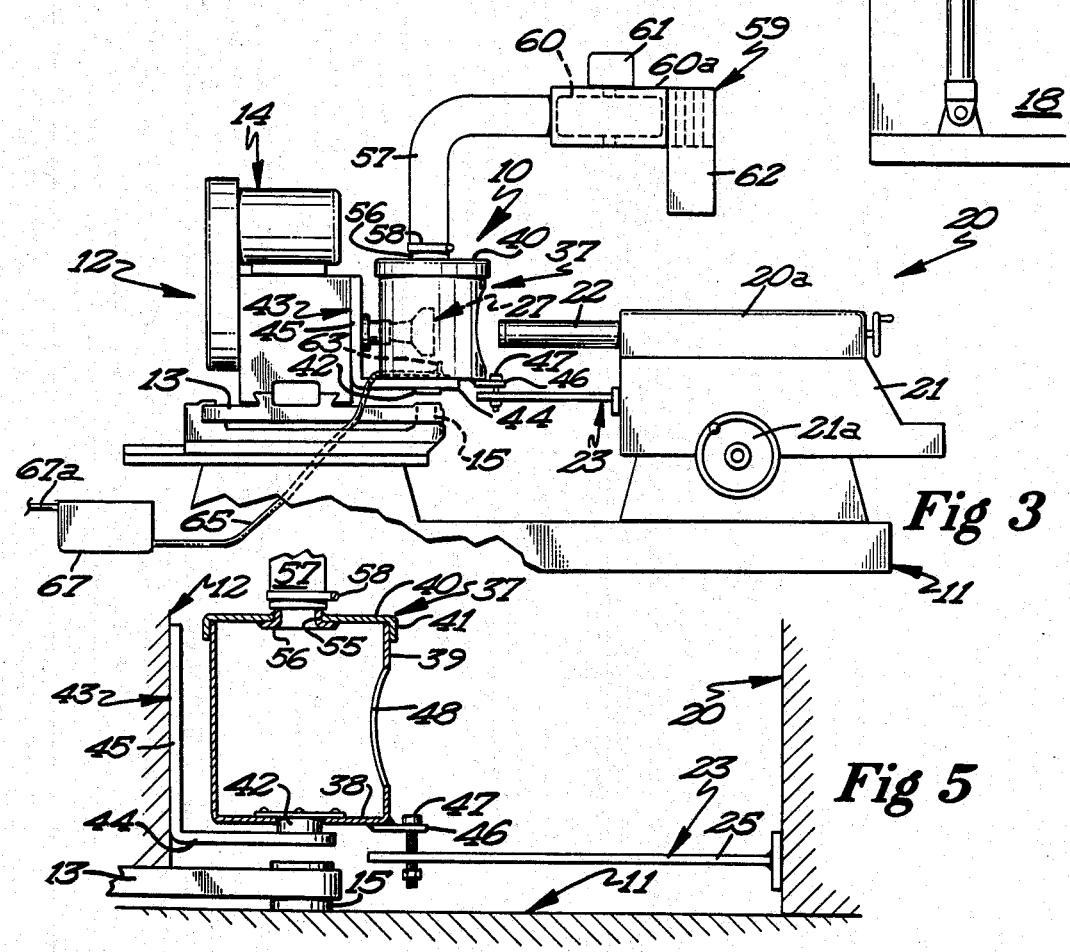
Fig 3
Fig 5

APPARATUS AND PROCESS FOR DRY CUTTING OF PLASTIC OPTICAL LENSES

BACKGROUND OF THE INVENTION

This is a continuation of application Ser. No. 694,445 filed Jan. 24, 1985, U.S. Pat. No. 4,589,231.

This invention relates to a process and apparatus for generating a lens from plastic material in a dry lens generating operation without the use of a liquid coolant.

At the present time, optical lenses are typically generated in a wet grinding operation. Conventional lens generators include a lens holder and a revolvable oscillating grinding tool positioned in a substantially closed chamber where the grinding or cutting operation occurs. The grinding tool not only revolves as it engages the stationary lens blank, but the grinding tool also moves in an arc of a variable radius and is adjustable to change the angle of attack with respect to the lens blank. With this arrangement, the grinding tool is capable of creating a horizontal curve with one radius and a vertical curve with a different radius.

A liquid coolant, such as mineral seal oil or water containing soluble additives, is constantly sprayed on the lens blank and the grinding tool during the grinding operation. The liquid coolant is used to reduce the temperature generated during the grinding operation, and to remove the swarf material removed from the lens blank. Excessive heat produced during the grinding operation can warp the surface of the lens. The grinding tool in conventional lens generators comprises a cuplike diamond wheel which cuts the media or swarf from the surface of the lens blank.

It has been found that, even though a liquid coolant is applied to the lens blank and the grinding tool during the grinding operation, warpage from heat still occurs. In this regard, it has been found that the coolant interacts with the swarf being removed to form a mulch that tends to keep the swarf material trapped against the diamond wheel and the surface of the lens blank during the grinding operation. This trapping of the swarf-laden coolant produces the heat during the grinding operation.

The same conventional lens generators have been used to generate plastic lenses from CR-39 and polycarbonate, but super-cooled coolants and various swarf separating devices have helped very little in eliminating warpage in this kind of operation. It will also be appreciated that, even though the grinding operation takes place in a substantially closed chamber, operators are constantly sprayed by the swarf-laden coolant, and the same coolant fouls the various components of the lens generator. The swarf-laden coolant in the wet grinding operation also constitutes a waste material which is difficult to dispose of.

SUMMARY OF THE INVENTION

It is a general object of this invention to provide a novel process and apparatus for generating a lens from plastic material in a dry lens generating operation without use of a liquid coolant.

A more specific object of this invention is to provide a novel lens generating apparatus including a grit-plated diamond tool which is so arranged and constructed that the spacing between the diamond particles is sufficient to allow sharp single point stock removal to thereby eliminate heat distortions of the plastic lens blank.

Another object of this invention is to provide a novel lens generating apparatus and process in which the grinding chamber has an inlet through which high volume, high velocity ambient air is introduced and has an outlet through which the air entrained swarf material is rapidly and quickly evacuated, thereby precluding the heat buildup between the lens blank surface and the grinding tool.

Another object of this invention is to provide a novel lens grinding tool and a novel lens grinding chamber and evacuation device which may be readily retrofitted to a conventional lens generating apparatus without any substantial modification and which converts the conventional lens generating apparatus from a wet grinding to dry cutting system.

FIGURES OF THE DRAWING

FIG. 2 is a top view of the lens grinding chamber structure, the lens mandrel, and the lens grinding tool with certain parts thereof broken away for clarity;

FIG. 3 is a diagrammatic side elevational view of apparatus illustrating in general the various components thereof;

FIG. 5 is a cross-sectional view of a portion of the apparatus illustrating details of construction of the chamber structure.

DETAILED DESCRIPTION OF THE PREFERRED EMBODIMENT

Figure 1:
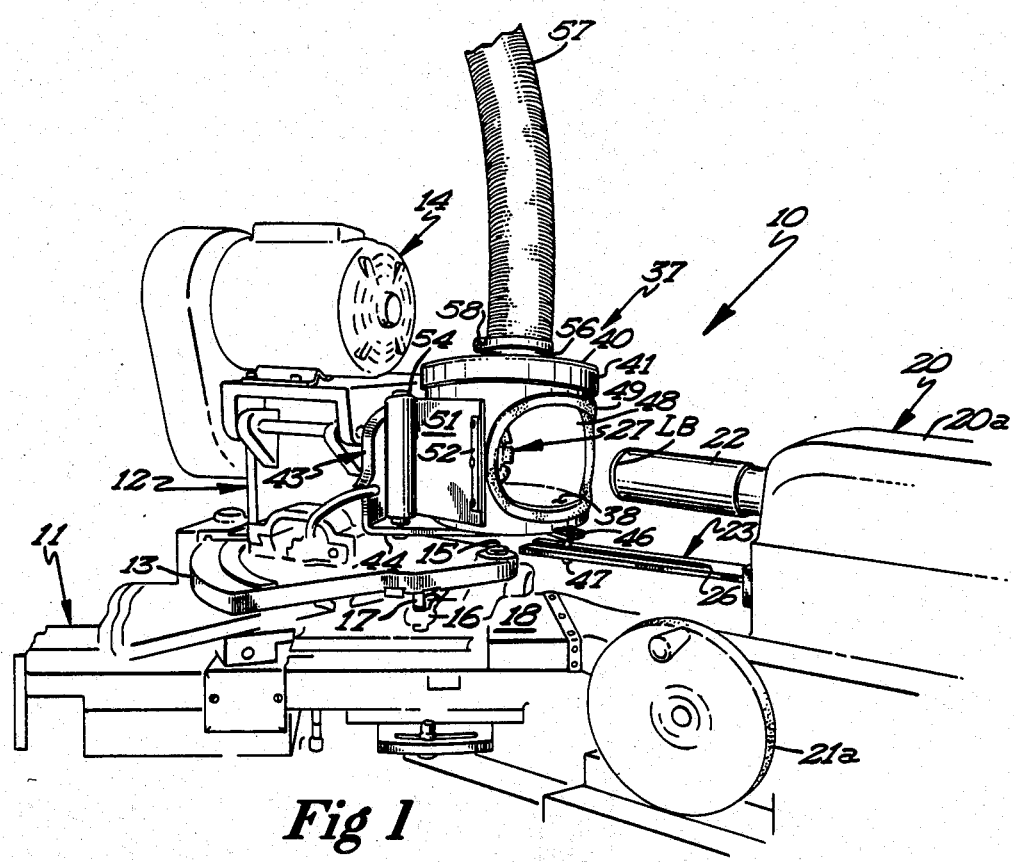
FIG. 1 is a perspective view of a lens generating apparatus incorporation the novel features of the present invention.

Referring now to the drawings and more specifically to FIG. 1, it will be seen that a conventional lens generating apparatus designated generally by the reference numeral 10 is thereshown. The lens generating apparatus includes a bottom slide 11 having a lens grinding tool assembly 12 rotatably mounted thereon. The lens grinding tool assembly 12 includes a table 13 having a motor and high speed spindle unit 14 thereon and being pivotally mounted by a vertical pivot 15 to the bottom slide 11. It will be noted that the pivot connection is eccentric relative to the table to permit the table to swing in horizontal arcuate fashion about a vertical axis relative to the bottom slide.

A double-acting hydraulic ram unit 16 is mounted on the bottom slide by a mounting plate 18 and the pivot rod thereof is pivotally connected by a pivot 17 to the table 13 to produce power shifting of the table about the pivot 15. The output shaft of the motor and high speed spindle unit 14 is provided with a tool holder chuck 19 for holding the grinding tool used in the grinding operation.

A lens collet assembly 20 is mounted on the tail stock slide 21 and includes an auxiliary slide 20a. It is pointed out that the entire collet assembly may be moved longitudinally of the bottom slide 11. The drive system also permits advancement and retraction of the collet 22. The tail stock slide 21 is shiftable with a manually operable actuating wheel 21a which is operatively connected to the collet 22 to permit manual advancing and retractive movement of the collet. It is pointed out that all of the aforementioned features of the lens generating apparatus are of conventional construction and do not, per se, form part of the present invention.

The collet housing 20a has an elongate L-shaped guide structure 23 secured thereto, as best seen in FIG. 1. The guide structure includes a vertical element 24 which is rigidly secured to the tail stock slide housing and which has an elongate horizontal guide element 25 integrally formed therewith and projecting therefrom. The horizontal guide element 25 has an elongate slot 26 therein which opens outwardly.

Figure 4:
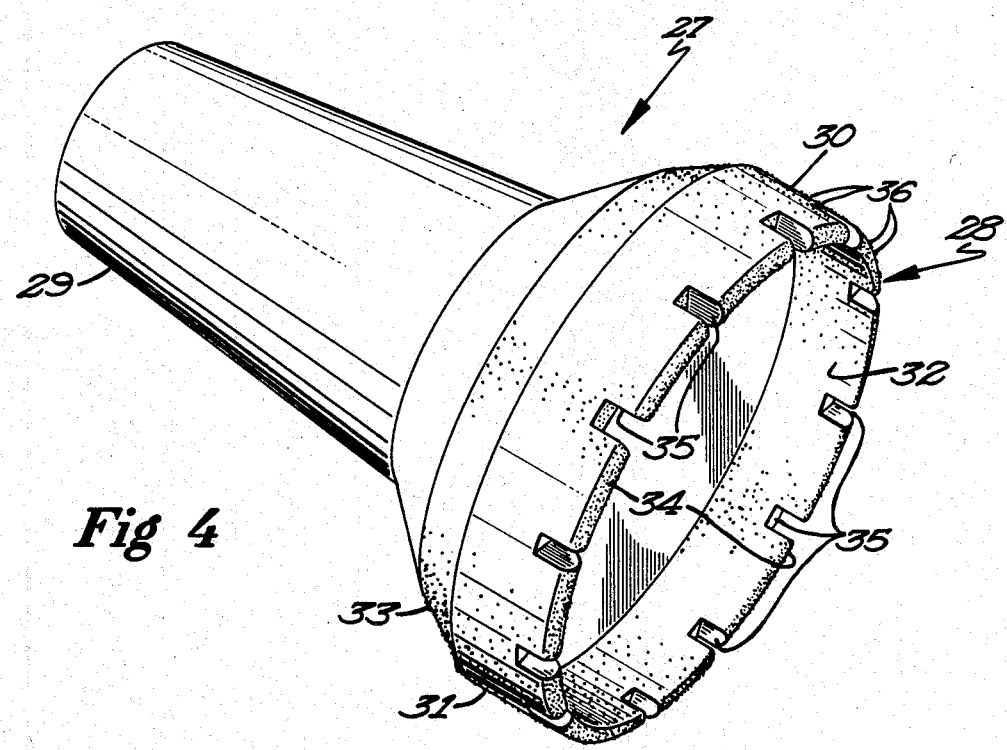
FIG. 4 is a perspective view of the novel grinding tool.

Referring now to FIGS. 2 and 4, it will be seen that the tool holder chuck 19 of the lens grinding tool assembly 12 is provided with a grinding tool 27. The grinding tool 27 includes a generally cup-shaped grinding wheel 28 having an elongate shank 29 that is received within the tool holder chuck 19. When the motor and spindle unit are engaged, the grinding tool 27 will also be revolved. It is also pointed out that, when the motor and high speed spindle unit are operated, the hydraulic ram is programmed to operate, thereby producing oscillation of the entire lens grinding tool assembly.

The cup-shaped grinding wheel 21 includes a cylindrical portion 30 having an outer cylindrical surface 31 and an inner cylindrical surface 32. The cup-shaped portion also includes a conical portion 33 which extends downwardly to the shank 29. The cup-shaped grinding wheel 28 also includes an arcuate end surface 34 that is continuous with the outer and inner cylindrical surfaces thereof. It will also be noted that the cylindrical portion 30 has a plurality of circumferentially spaced apart axially extending slots 35 therein.

The outer cylindrical surface 31, the inner cylindrical surface 32, the arcuate end surface 34, and a part of the surface of the conical portion 33 are grit-plated with a plurality of diamond particles. In the embodiment shown, the grinding tool has a 3½ inch diameter and the spacing of the various diamond particles 36 is extremely important in permitting dry grinding of plastic lenses made of CR-39 or polycarbonate.

In this regard, the outer cylindrical surface 31 and the grit-plated conical portion 33 together have an axial dimension of 25 millimeters. This excludes the small axial dimension of the arcuate end surface 34. The 25 millimeter exterior surface of the cylindrical portion and conical portion is coated with a 20 grit-plating. The inner cylindrical surface 32 has an axial dimension of 12 millimeters and is coated with a 20 grit-plating. Finally, the arcuate end surface 34 has a ⅛ inch radius and is coated with 30 grit-plating.

It will be seen that the greatest surface area of the diamond grit-plating is 20 grit, but that the small arcuate end surface 34 has a 30 grit-plating. With this arrangement, the grinding tool produces a plurality of sharp single point removal of the swarf material from the lens blank during the grinding operation. This eliminates material buildup between the lens blank and the grinding tool, and any heat generated by this grinding action is quickly removed by the rapid removal of the swarf material.

One of the improved features of the lens generating apparatus 10 is the particular construction and operation of the cylindrical chamber structure 37, which includes a bottom wall 38, a peripheral or circumferential wall 39, and a top wall or cover plate 40. The top wall 40 has a circumferential flange 41 integrally formed therewith and depending therefrom. The bottom wall 38 has a depending pin 42 integrally formed therewith, which is journaled in a bearing (not shown) on an L-shaped bracket 43. The L-shaped bracket includes a horizontal leg 44 and a vertical leg 45, the latter being secured to the lens grinding tool assembly 12 for movement therewith. The journal element on the bottom wall 38 of the chamber structure permits the chamber structure to remain in alignment during movement of the lens grinding tool assembly 12.

The chamber structure 37 has a small bracket 46 affixed thereto and projecting outwardly therefrom. The bracket 46 has a guide bolt 47 extending through a threaded opening in the bracket and engaging in the elongate slot 26 of the guide structure 23. The guide bolt 47 prevents rotation of the chamber structure during oscillating movement of the lens grinding tool assembly 12.

The chamber structure 37 has an enlarged first opening 48 in the circumferential wall 39 thereof, and the edges defined by the opening 48 are covered with a yieldable cover element 49. The collet 22 projects through the opening 48 and into the chamber structure 37 during the grinding operation. It will be noted that the cross-sectional size of the opening 48 is substantially larger than the cross-sectional size of the collet 22 so that a substantially large unobstructed zone is defined exteriorly of the collet. This unobstructed zone permits the continuous flow of high volume, high velocity ambient air into the chamber structure during the grinding operation. This air flow is essential in performing a cooling action and also permitting the swarf material to be entrained in an air stream and evacuated from the chamber.

The circumferential wall 39 of the chamber structure 37 also has a second opening 50 therein and this opening extends circumferentially in an arc greater than 180 degrees. The grinding tool projects through this opening and the large size of the opening permits movement of the lens grinding tool assembly continuously through its laterally oscillating cycles.

Means are provided for limiting the size of the large second opening 50 to a size which permits the lens grinding tool and associated chuck to project through the housing, but which effectively closes the remaining portion of the opening 51 while allowing lateral oscillation of the lens grinding tool assembly 12. This means includes a pair of elongate vertically disposed rubber curtains 51, each being secured at one end thereof by one of a pair of clamping plates 52 secured to the peripheral wall 39 by bolts 53 adjacent the first opening 48. Each of the rubber curtains 51 has its other end portion wound upon a pair of spring loaded rollers 54 revolvably mounted on suitable brackets carried by the lens grinding tool assembly 12. It will be appreciated that, as the lens grinding tool assembly 12 oscillates through a horizontal arc relative to the chamber structure 37, one of the rubber curtains will be unwound from its associated spring loaded roller 54, while the other curtain will be wound upon its roller. This arrangement effectively closes the large second opening 50 around the tool chuck housing of the lens grinding tool assembly 12.

The top plate of the chamber structure has an opening 55 therein which is provided with a fitting 56. The fitting 56 has one end of an elongate bellows-type hose 57 secured thereto by a clamp 58. The other end of the hose 57 is connected to a vacuum driven fan unit 59 including a fan housing 60a having a fan 60 mounted therein and driven by a suitable motor 61. During the grinding operation, the swarf material will be evacuated through the vacuum hose 57 into the fan housing 60a and will eventually be directed to a collection box 62.

The vacuum driven fan unit 59 is provided with suitable filters (not shown) and baffles (not shown) to permit separation of the air from the particles of swarf material. The collector 62 may be provided with collection bags to facilitate disposal of the swarf material.

The optical lenses which are generated are formed from plastic material, such as CR-39 or polycarbonate. When polycarbonate is used, swarf sometimes tends to adhere to the irregular surface of the grinding tool 27. Means are therefore provided for eliminating this condition and this means includes a mist dispensing nozzle 63 which projects through an opening in second opening 50 and which is secured thereto by a clamping plate 64. The mist dispensing nozzle is connected to a conduit 65 which has its other end connected to a source of liquid lubricant and air pressure. When the mist generator system is actuated, the mist dispensing nozzle 63 will direct an extremely fine mist into the zones defining the interfaces between the lens blank and the grinding tool. The mist generator includes an air line connected to a reservoir 67 containing the lubricant. An air line 67a forms the liquid lubricant into a mist. The mist prevents the adhesion of the swarf particle of polycarbonate with the grinding tool and these particles are entrained in a stream of air during the grinding operation and are evacuated through the vacuum hose 57.

In operation, the lens blank will be secured to the distal end of the lens collet 22. The collet will be advanced until the collet is positioned within the chamber structure 37 and in contacting relation with the grinding tool 27. It will be appreciated that the particular curves to be generated on the lens blank are typically pre-programmed into a computer controller which controls the operation of the collet and grinding tool assembly. During the grinding operation, the vacuum driven fan unit 59 will be energized so that, as the particles of swarf are continuously removed from the lens blank, high volume, high velocity ambient air will pass through the opening 48 and will entrain the swarf particles therein for passage through the vacuum hose 57. The rapid removal of the particles prevents the formation of a mulch at the interface between the lens blank and the grinding tool. Therefore, heat buildup, which is normally attendant in the conventional grinding operation because of the buildup of material at this interface, will be eliminated. Further, the spacing between the diamond elements 36 forming the grit plate permits single point removal of the material, which reduces the friction buildup. The swarf material will accumulate in collection bags in the collector 62 and may be readily removed and disposed of.

There will be no dust particles generated during the grinding operation because the high volume, high velocity ambient air passing through the opening 48 and the continuous vacuuming of the particles through the vacuum hose 57 simply prevents this from occurring.

When polycarbonate lenses are generated, the mist is only sufficient to prevent adherence of the polycarbonate particles to the grinding wheel. The mist does not produce a wet interior of the chamber structure in the manner of wet grinding. The particles are quickly entrained in the air stream and are evacuated for disposal in the collector 62.

From the foregoing, it will be seen that I have provided a novel process and apparatus for dry grinding of lenses from plastic material, such as CR-39 and polycarbonate.

It will also be seen, from the preceding description, that the various components which permit dry grinding of plastic lenses may be easily retrofitted to any conventional lens generating apparatus. In this regard, the chamber structure 37 may be substituted for the conventional chamber structure. The vacuum removal and misting system will be provided, along with the novel grinding tool 27.

Thus, it will be seen that I have provided a novel dry grinding process and apparatus which has never heretofore been practiced.

What is claimed is:

1. A lens generating process for generating plastic lenses in a dry operation without the use of liquid coolant, the lens to be ground being mounted on a horizontal lens holder, consisting of the steps of:

positioning the lens blank in a chamber and, while engaging one surface thereof with a revolvable multi-grit plated diamond grinding medium, the grinding medium being oscillatable in a horizontal path relative to the lens blank, the diamond grinding medium, when revolved, continuously cutting swarth material from the lens blank as the grinding medium is oscillated relative to the lens blank during the grinding and cutting operation, the chamber being defined by a chamber structure having a top wall, bottom wall, and a peripheral wall, introducing a high volume, high velocity flow of air into the chamber through an opening in the peripheral wall of the chamber structure through which the lens holder projects and simultaneously evacuating the air through a vacuum conduit connected to an opening in the top wall of the chamber structure above the inner engaging grinding medium and lens blank to form a high volume, high velocity stream of air across the interface between the lens blank and the grinding medium to entrain the plastic swarth in the stream of air to thereby continuously cool the lens blank and grinding medium and continuously remove the cut plastic swarth material from the chamber.

* * * * *

UNITED STATES PATENT AND TRADEMARK OFFICE
CERTIFICATE OF CORRECTION

PATENT NO. : 4,655,005

DATED : Apr. 7, 1987

INVENTOR(S) : Tiner E. Roberts

It is certified that error appears in the above-identified patent and that said Letters Patent is hereby corrected as shown below:

The term of this patent subsequent to May 20, 2003, has been disclaimed.

Signed and Sealed this

Sixth Day of December, 1988

*Attest:*

DONALD J. QUIGG

*Attesting Officer*  *Commissioner of Patents and Trademarks*